US009720980B2

(12) United States Patent
Thomas et al.

(10) Patent No.: US 9,720,980 B2
(45) Date of Patent: *Aug. 1, 2017

(54) EVALUATING TYPEABILITY OF DOMAIN NAMES

(71) Applicant: VERISIGN, INC., Reston, VA (US)

(72) Inventors: Matthew Thomas, Atlanta, GA (US); Jasenko Ibrahimbegovic, Lausanne (CH)

(73) Assignee: VERISIGN, INC., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,146

(22) Filed: Nov. 13, 2015

(65) Prior Publication Data
US 2016/0070710 A1 Mar. 10, 2016

Related U.S. Application Data

(63) Continuation of application No. 13/336,400, filed on Dec. 23, 2011, now Pat. No. 9,195,316.

(51) Int. Cl.
| | | |
|---|---|---|
| *G06F 3/00* | (2006.01) | |
| *G06F 17/30* | (2006.01) | |
| *G06F 3/023* | (2006.01) | |
| *G06Q 10/00* | (2012.01) | |
| *G06Q 10/06* | (2012.01) | |

(52) U.S. Cl.
CPC ........ *G06F 17/3053* (2013.01); *G06F 3/0233* (2013.01); *G06Q 10/00* (2013.01); *G06Q 10/0639* (2013.01)

(58) Field of Classification Search
None
See application file for complete search history.

(56) References Cited

U.S. PATENT DOCUMENTS

| 7,259,751 B2 | 8/2007 | Hughes et al. |
| 7,386,892 B2 | 6/2008 | Gilfix et al. |
| | (Continued) | |

FOREIGN PATENT DOCUMENTS

| FR | 2953957 A1 | 6/2011 |
| GB | 2313939 A | 12/1997 |

OTHER PUBLICATIONS

Anonymous, "Determining how difficult a word is to type on a QWERTY keyboard", Retrieved from the Internet: http://stackoverflow.com/questions/4459352/determining-how-difficult-a-word-is-to-type-on-a-qwerty-keyboard, Dec. 16, 2010, pp. 1-2.

(Continued)

*Primary Examiner* — Michael D Yaary
(74) *Attorney, Agent, or Firm* — MH2 Technology Law Group, LLP

(57) ABSTRACT

Methods and systems are disclosed for assessing an identifier. The method comprises receiving a string of characters making up the identifier and determining a keyboard type for a keyboard. The method further comprises calculating, by a calculator module, a typeability score for the identifier based on the string of characters and the keyboard type, wherein the typeability score signifies a difficulty of typing the identifier on the keyboard type. In certain embodiments, the method further comprises determining a finger positioning corresponding to a position of a typer's fingers on the keyboard, and the typeability score is further based on the finger positioning. In some embodiments, the finger positioning is based on the typer's typing habits.

21 Claims, 9 Drawing Sheets

(56) References Cited

U.S. PATENT DOCUMENTS

| | | |
|---|---|---|
| 8,489,635 B1 | 7/2013 | Phoha et al. |
| 2008/0177920 A1 | 7/2008 | Dennis |
| 2009/0254545 A1 | 10/2009 | Fisken |
| 2010/0027854 A1 | 2/2010 | Chatterjee et al. |
| 2010/0328110 A1 | 12/2010 | Brown et al. |

OTHER PUBLICATIONS

Extended European Search Report dated Aug. 4, 2015, European Application No. 12197279.8, pp. 1-11.
A. Tsubokura et al., "Analysis of Key Typing Process using Hand Position process", IEEE Proceedings of the International Conference on Computers in Education, 2002, pp. 1-2.

EVALUATING TYPEABILITY OF DOMAIN NAMES

CROSS-REFERENCE TO RELATED APPLICATIONS

This application is a continuation of U.S. application Ser. No. 13/336,400 filed on Dec. 23, 2011, which is hereby incorporated by reference.

TECHNICAL FIELD

The present disclosure relates generally to methods and systems for generating and assessing identifiers and in particular to assessing typeability of identifiers, including domain names.

BACKGROUND

People use a variety of electronic devices to enter text. Such electronic devices include desktop or laptop computers, handheld devices, remote control devices, and telephone pads. Different devices have different types of text entry systems, such as keyboards or keypads, for receiving a text from a user. Users often enter into the device a specific pre-determined string of characters as an identifier to access a specific target. Such identifiers include entries in an address book for accessing an address, email addresses for accessing a recipient, domain names for accessing a domain host, or web addresses to access a website. A domain name, for example, can be a string of characters corresponding to a host address based on the rules and procedures followed by the Domain Name System (DNS). Once the domain name owner selects a domain name and registers it to a user, the user may enter the domain name in a web browser, for instance, to access the domain host.

The creator of an identifier is free to choose any not-yet-used identifier that conforms to some preset limitations. The preset limitations are usually broad, and may include a protocol such as the DNS's protocol for domain names, or characters that are available on the text entry system such as keys of a keyboard. Within this broad scope, the creator usually chooses an identifier that is reminiscent of the content of the corresponding target. For example, when choosing an identifier for an address book entry corresponding to a person, the creator may choose the first name or the last name of the person, some parts or abbreviations for the person's name, or some other alias that reminds the user of the person. Similarly, when selecting a domain name for a domain host, the selector often selects a domain name that corresponds to the content that the host presents. For example, a domain name for a shoe selling website may include the characters "shoes" or "shoesales," or a domain name for a high-energy-particles accelerator may include the characters "accelerator" or "HighEnergyParticles."

SUMMARY

In some systems, when the creator tries to create a new identifier on a corresponding system, the system proposes some possible identifiers from among various candidate names that have not been previously used. For example, purchasers of new domain names may themselves propose the new domain name or may request from an auxiliary system for domain name suggestion to suggest a new domain name from a list of available domain names. The auxiliary system may evaluate the proposed or available domain names based on their semantic meanings and the correspondence between that meaning and the content of the target.

A creator of an identifier, however, can select the identifier not only for its relevance to the content of the target, but also for its ease of typing. The present application is directed to methods and systems for calculating a typeability score for textual identifiers, including domain names. In some embodiments, the typeability score measures the ease or difficulty of typing any given identifier. In various embodiments, the typeability score depends on the character string for the identifier as well as the type of the text entry system employed by the typer. The text entry system can be, for example, a QWERTY keyboard or a particular mobile device key pad. Such information is useful, for example, to a domain name purchaser seeking an easy-to-type domain name.

In some embodiments, a method for assessing an identifier comprises receiving, via an interface, a string of characters making up the identifier; determining a keyboard type for a keyboard; and calculating, by a calculator module, a typeability score for the identifier based on the string of characters and the keyboard type, wherein the typeability score signifies a difficulty of typing the identifier on the determined keyboard type.

In some embodiments, a non-transitory computer readable medium is encoded with a computer program, wherein the computer program, when executed by one or more computer processors, causes the one or more computer processors to execute a method for assessing an identifier, and wherein the method comprises receiving a string of characters making up the identifier; determining a keyboard type for a keyboard; and calculating a typeability score for the identifier based on the string of characters and the keyboard type, wherein the typeability score signifies a difficulty of typing the identifier on the determined keyboard type.

In some embodiments, calculating the typeability score for the identifier comprises calculating, by the calculator module, a plurality of metrics for typing the string of characters based on the keyboard type; and calculating the typeabilty score as a weighted sum of the plurality of metrics.

In some embodiments, the method further comprises determining a finger positioning corresponding to a position of a typer's fingers on the keyboard, wherein the typeability score is further based on the finger positioning.

In some embodiments, determining the finger positioning comprises receiving the finger positioning or setting the finger positioning to a default finger positioning that corresponds to the keyboard type.

In some embodiments, the method further comprises calculating typeability scores for a plurality of identifiers; and sorting the plurality of identifiers based on the typeability scores and presenting the sorted plurality of identifiers to a user.

In some embodiments, the method further comprises assessing, based on the typeability score, whether the identifier is generated by an automated process, wherein the assessing comprises calculating a probability that the identifier is generated by an automated process and wherein the probability is non-decreasing function of the typeability score.

In some embodiments, determining the keyboard type for the keyboard includes receiving the keyboard type or setting the keyboard type to a default keyboard type.

In some embodiments, calculating the typeability score for the identifier comprises calculating a plurality of metrics for typing the string of characters based on the keyboard type; and calculating the typeability score as a weighted sum of the plurality of metrics, wherein the weighted sum assigns a weight to each of the plurality of metrics based on an importance of the corresponding metrics to the ease or difficulty of typing the identifier.

In some embodiments, the method further comprises determining a finger positioning corresponding to a position of a typer's fingers on the keyboard, and wherein the typeability score is further based on the finger positioning, wherein the finger positioning is based on the typer's typing habits.

In some embodiments, the method further comprises proposing the identifier to a user based on the calculated typeability score.

In some embodiments, the method further comprises assessing, based on the typeability score, whether the identifier is generated by an automated process.

In some embodiments, the calculated typeability score is a raw typeability score and the method further comprises calculating a normalized typeability score via dividing the raw typeability score by a maximal typeability score or by a number of characters in the string of characters.

In some embodiments, determining the keyboard type for the keyboard includes receiving the keyboard type or setting the keyboard type to a default keyboard type.

In some embodiments, a system for assessing an identifier comprises an interface for receiving a string of characters for the identifier; and a calculator module for calculating a typeability score for the identifier based on the string of characters and a keyboard type for a keyboard, wherein the typeability score signifies a difficulty of typing the identifier on the type of keyboard.

In some embodiments, the identifier is a domain name.

It is to be understood that both the foregoing general description and the following detailed description are exemplary and explanatory only and are not restrictive of the invention, as claimed.

BRIEF DESCRIPTION OF THE DRAWINGS

The drawings are not necessarily to scale. Instead, emphasis is generally placed upon illustrating the principles of the inventions described herein. The accompanying drawings, which are incorporated in and constitute a part of this specification, illustrate several embodiments consistent with the inventions and together with the description, serve to explain the principles of the inventions. In the drawings.

DETAILED DESCRIPTION

Figure 1A:
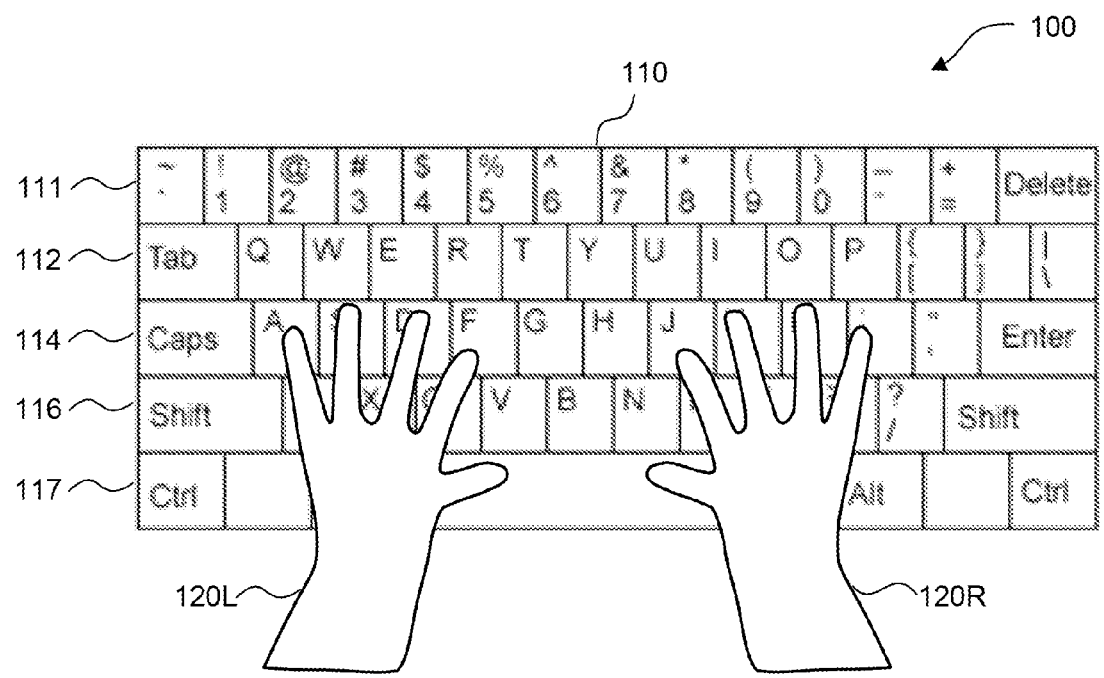
FIG. 1A illustrates a view of a QWERTY keyboard layout and a finger positioning for that layout in accordance with some embodiments.

The following detailed description refers to the accompanying drawings. Wherever possible, the same reference numbers are used in the drawings and the following description to refer to the same or similar parts. Also, similarly-named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the embodiments described. While several exemplary embodiments and features are described herein, modifications, adaptations, and other implementations are possible, without departing from the spirit and scope of the invention. Accordingly, the following detailed description does not limit the invention. Instead, the proper scope of the invention is defined by the appended claims.

A creator of an identifier can select the identifier not only for its relevance to the content of the target, but also for its ease of typing. For example, of the two equal length character strings "klass" and "my-11", "klass" is easier to type for a common typer on a standard QWERTY keyboard because "klass" requires less movement of the fingers of the typer and involves keys that are closer to the original positions of the fingers. An identifier that is more typeable, that is, easier to type, will speed up the typer's typing, reduce the typer's typing fatigue, reduce the risk of typographical errors, etc. Typographical errors when entering a domain name, for example, can result in typer frustration or deviation to an incorrect, even harmful, domain. Therefore, a more typeable identifier is often more desirable. Choosing a more typeable domain name can also significantly improve internet traffic received by the host of the domain name, because users are more likely to successfully reach a more typeable domain name after first few tries, while users will give up trying to reach the less typeable domain name after one or more failed tries.

Various embodiments also determine the typeability of an identifier for a specific device. In some embodiments, typeability measures how easy or how difficult the identifier is to type based on the keyboard layout and the positioning of the fingers of the typer. Alternatively, in some embodiments, typeability measures the probability that a typer may mistype the identifier. In certain embodiments, these two measures are related, because an identifier that is more difficult is also more prone to be mistyped.

FIG. 1A illustrates a view 100 of a QWERTY keyboard layout and a finger positioning for that layout in accordance with some embodiments. View 100 shows a standard QWERTY keyboard 110 and a finger positioning of two hands of a typer, left hand 120L and right hand 120R. Keyboard 110 includes a number row 111 at the top, three character rows 112, 114, and 116 positioned below number row 111, and a space bar row 117 positioned below the three character rows. The three character rows consist of a top character row, also called top row 112, a middle row, also called a home row 114, and a bottom character row, also called bottom row 116. Left and right hands 120L and 120R each include five fingers; a thumb, an index finger, a middle finger, a ring finger, and a little finger.

View 100 also shows a finger positioning, that is, a positioning of the fingers of the typer's left and right hands, 120L and 120R, with respect to QWERTY keyboard 110 according to one embodiment. In particular, the finger positioning in view 100 corresponds to a standard ten-finger positioning. In this standard finger positioning, the thumbs of left and right hands 120L and 120R are positioned over the space bar in space bar row 117. Further, the index, middle, ring, and little fingers of left hand 120L are respectively positioned over the F, D, S, and A keys in home row 114. Moreover, in this standard finger positioning, the index, middle, ring, and little fingers of right hand 120R are respectively positioned over the J, K, L, and semicolon keys in home row 114. For ease of reference, each of these keys is called a home position of the corresponding typing finger. That is, for example, the F key is the home position of the left index finger, and the K key is the home position of the right middle finger.

In various embodiments, the keyboard layout and the finger positioning affect the typeability of a string by determining the moves made by the fingers for entering characters. For example, in the embodiment of FIG. 1A, to enter each character, one or more of the fingers press one or more of the keys in keyboard 110 by following the move patterns of a standard ten-finger typing. For example, to enter the character "a", the little finger of left hand 120L presses the A key, which is positioned in home row 114 and just below that little finger. Similarly, to enter the character "f", the index finger of left hand 120L presses the F key, which is positioned in home row 114 and just below that index finger. To enter the character "t", on the other hand, the same index finger of left hand 120L presses the T key positioned in top row 112 after travelling the distance between its home position, the F key, and the target T key. Similarly, to enter the dash character "-", the little finger of right hand 120R presses the dash key positioned in number row 111 after travelling the distance between its home position, the semicolon key, and the dash key. In certain embodiments, each of these keys is considered to be assigned to the corresponding typing finger. That is, the T key is assigned to the left index finger, and the dash key is assigned to the right little finger. Similarly, the G and H keys, in the home row, are respectively assigned to the left and right index fingers.

In various embodiments, the assignments of fingers to keys may depend on the keyboard type, the finger positioning, the habits of the typer, etc. In particular, in certain embodiments the finger positioning and the finger assignments depend on the typing habits of the typer. For example, a typer may type on a QWERTY keyboard using the standard ten-finger positioning of FIG. 1A if the typer is trained and accustomed to typing with the ten fingers. A typer may also type on a QWERTY keyboard using other types of finger positioning.

Figure 1B:
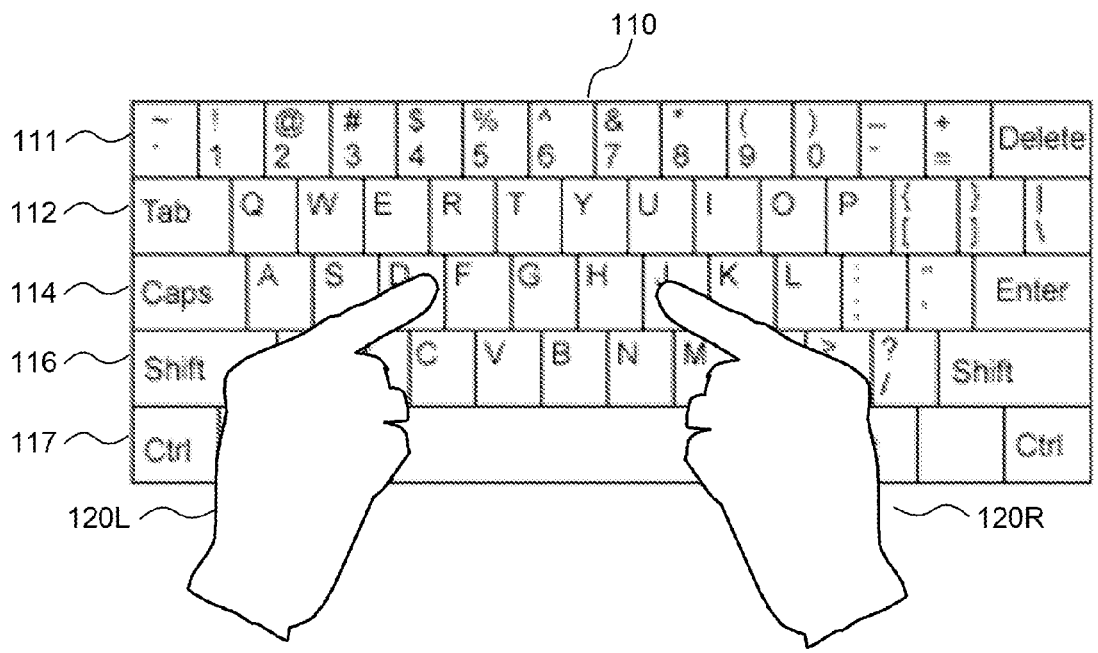
FIG. 1B illustrates a view showing a non-standard finger positioning over the QWERTY keyboard layout in accordance with some embodiments.

FIG. 1B, for example, illustrates a non-standard finger positioning over the QWERTY keyboard layout in accordance with some embodiments. FIG. 1B shows standard QWERTY keyboard 110 and left and right hands 120L and 120R positioned over keyboard 110 in a non-standard two-finger positioning. In some embodiments, a typer employs this two-finger positioning and a corresponding two-finger typing style to enter the characters. In the non-standard two-finger positioning of FIG. 1B, the right and right index fingers are typically positioned over the D and J keys. During two-finger typing, these two index fingers enter all characters by pressing one or more keys. For example, to enter the character "a", the left index finger of left hand 120L presses the A key positioned in home row 114 after travelling the distance between the D key and the A key. To enter the dash character "-", on the other hand, the index finger of right hand 120R presses the dash key positioned in number row 111 after travelling the distance between the J key and the dash key. A typer may employ the two-finger typing style due to, for example, the typer's typing habits. In other embodiments, the non-standard finger positioning includes other types of finger positioning, including those of hunt and peck typists.

Figure 2A:
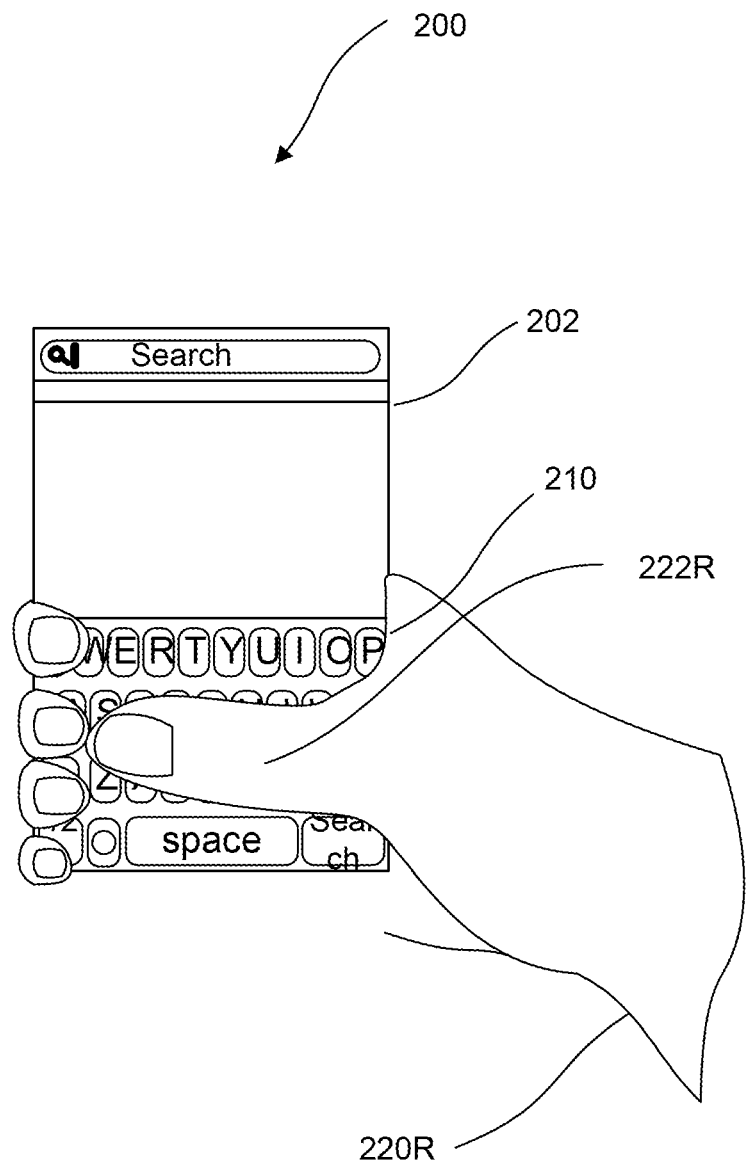
FIGS. 2A and 2B illustrate standard finger positioning for two non QWERTY keyboard layouts in accordance with various embodiments.
Figure 2B:
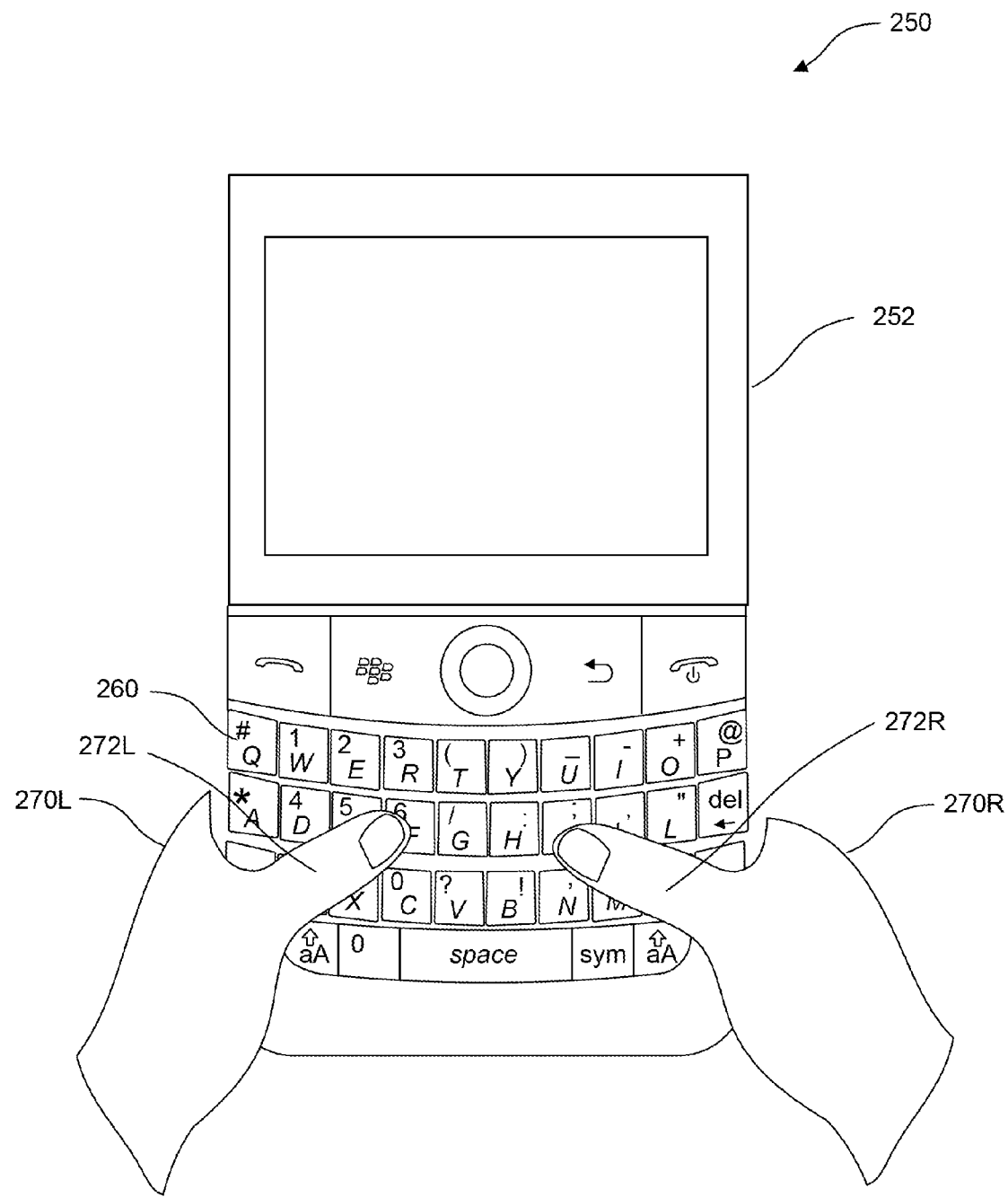

In various embodiments, the finger positioning also depends on the size and/or the layout of the keyboard. FIGS. 2A and 2B illustrate standard finger positioning for two other keyboard layouts in accordance with various embodiments. FIG. 2A illustrates a view 200 for a typer's one-thumb finger positioning over a keyboard 210 of a second type in accordance with some embodiments. In some embodiments, keyboard 210 is similar to an iPhone® style keyboard. FIG. 2B, on the other hand, illustrates a view 250 for a typer's two-thumb finger positioning over a keyboard 260 of a third type in accordance with some other embodiments. In some embodiments, keyboard 260 is similar to a Blackberry® style keyboard. View 200 shows a handheld device 202 and a typer's right hand 220R. Handheld device 202 includes a keyboard 210 of the second type. Further, in view 200, fingers of right hand 220R are positioned over keyboard 210 in a one-thumb finger positioning. In the one-thumb finger positioning of FIG. 2A, right hand 220R holds handheld device 202 such that the tip of thumb 222R of right hand 220R is positioned over the G key around the center of keyboard 210. In the embodiment of FIG. 2A, a typer enters every character by pressing one or more keys of keyboard 210 with thumb 222R. For example, to enter the character "a", thumb 222R presses the A key by travelling the distance between the G key and the A key. In various embodiments, the one-thumb finger positioning is the standard finger positioning for a keyboard that has a layout and a size similar to those of keyboard 210.

In FIG. 2B, view 250 shows another handheld device 252 and a typer's left and right hands 270L and 270R. Handheld device 252 includes a keyboard 260 of the third type. Further, in view 250, fingers of right and left hands 270L and 270R are positioned over keyboard 260 in a two-thumb finger positioning. In the two-thumb finger positioning of FIG. 2B, right and left hands 270L and 270R hold handheld device 252 such that the tip of thumb 272L of left hand 270L is positioned over the F key of keyboard 260 and the tip of thumb 272R of right hand 270R is positioned over the J key of keyboard 260. In the embodiment of FIG. 2B, a typer enters every character by pressing one or more keys of keyboard 260 with thumb 272L or thumb 272R. For example, to enter the character "a", thumb 272L presses the A key by travelling the distance between the F key and the A key. Similarly, to enter the character "o", thumb 272R presses the O key by travelling the distance between the J key and the O key. In various embodiments, the two-thumb finger positioning is the standard finger positioning for a keyboard that has a layout and a size similar to those of keyboard 260.

Various embodiments assess the typeability of an identifier by calculating a typeability score. In some embodiments, a typeability score is a number that quantitatively measures the typeability of the identifier. Various embodiments use an algorithm for calculating the typeability score. In calculating the typeability score, the algorithm may use a number of quantitative metrics related to the ease or difficulty of typing each character in the identifier. In some embodiments, each of these quantitative metrics depends not only on the string of characters in the identifier, but also on the keyboard layout and the typer's fingering positioning for that keyboard layout. Therefore, in some embodiments the algorithm accepts, as an input, the character string of the identifier, the keyboard layout, and/or the typer's fingering positioning.

Figure 3:
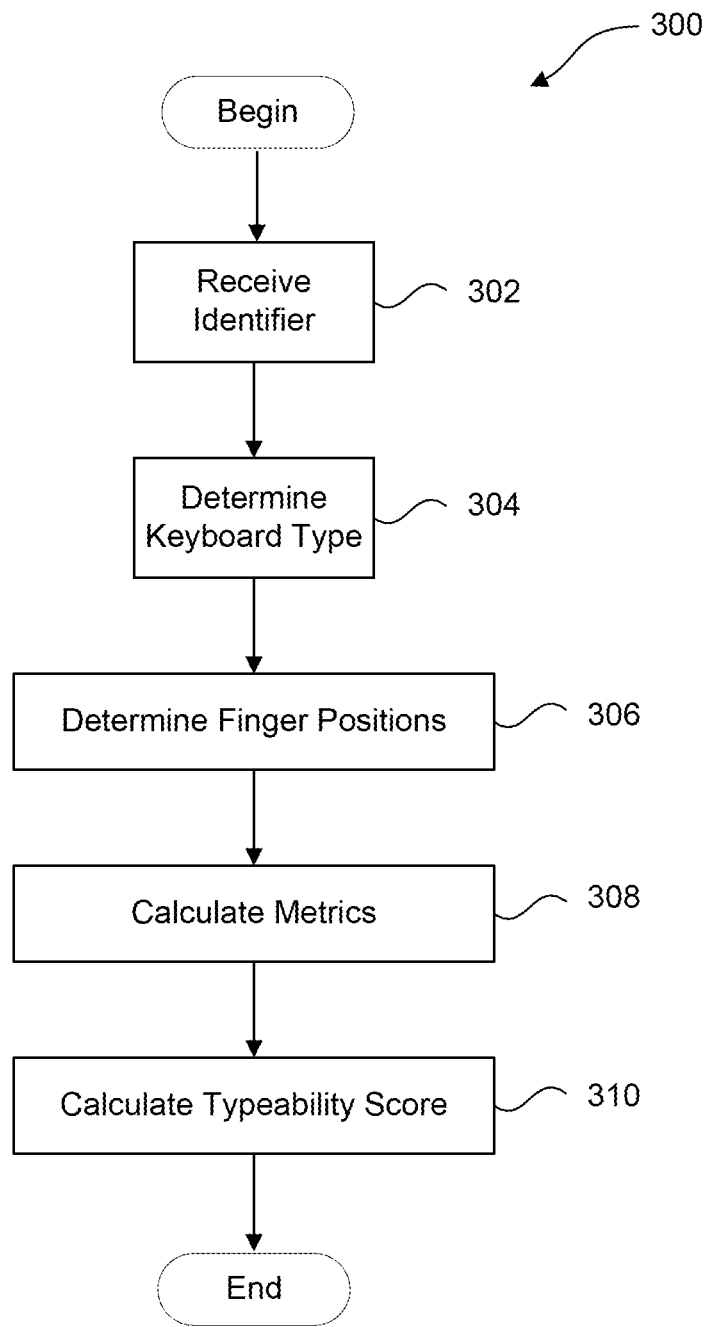
FIG. 3 illustrates a method for calculating the typeability score in accordance with some embodiments.

FIG. 3 illustrates a method 300, depicting an algorithm for calculating a typeability score in accordance with some embodiments. Method 300 receives inputs that include one or more of the string of characters for the identifier, the keyboard layout, and the finger positioning. Method 300 generates output that include a typeability score for the identifier. In certain embodiments, Method 300 may be performed by a computer processor executing software code stored in a computer memory.

In block 302, method 300 receives the string of characters for the identifier. The string of characters consists of the characters that a typer types for entering the identifier. In some embodiments, the identifier includes the domain name for a new domain.

In block 304, method 300 determines a keyboard type for entering the identifier. In various embodiments, the keyboard type may be a QWERTY keyboard, an iPhone® style keyboard, a Blackberry® style keyboard, etc. In other embodiments, the keyboard type may be a type of a phone keypad, a QWERTZ keyboard, a Dvorak keyboard, a touch screen, or some other type of input device used for entering a text.

In some embodiments, block 304 determines the keyboard type by receiving a keyboard type entered by a user. In some other embodiments, method 300 may offer to the user a default type for the keyboard. Alternatively, if the user does not enter a keyboard type, method 300 may use the default keyboard type as the keyboard type entry. In some embodiments, the default keyboard type may depend on the geographical location or the language of the typer and may be the most common keyboard type for that geographical location or language. For example, in some embodiments, method 300 may suggest or use as the default keyboard type the QWERTY keyboard type for a North American typer or a QWERTZ keyboard type for a German or central European typer. In some embodiments, a user may change the suggested or default keyboard type to another keyboard type. Method 300 uses the keyboard type to derive the keyboard layout used for calculating the typeability score.

In block 306, method 300 determines the finger positioning of the typer. In some embodiments, block 306 determines the finger positioning by receiving that positioning from a user. For example, a user may enter standard ten-finger positioning or two-finger positioning. In some embodiments, method 300 may offer to the user a default as the finger positioning. Alternatively, if the user does not enter a finger positioning, method 300 may use a default as the finger positioning. In some embodiments, the default or suggested finger positioning depends on the keyboard type and is the standard finger positioning for the keyboard type determined in block 304. For example, in some embodiments, method 300 uses the standard ten-finger positioning as the default for a QWERTY keyboard, the standard one-thumb finger positioning for an iPhone® style keyboard, or the standard two-thumb finger positioning for a Blackberry® style keyboard.

In some embodiments, a user may enter the finger positioning, or change the suggested or default finger positioning, based on the typing habits of the typer. For example, for a QWERTY keyboard, a user may enter a two-finger positioning because the typer is used to two-finger typing on a QWERTY keyboard. In some embodiments, method 300 uses the most common finger positioning for the specific keyboard type. In certain embodiments, method 300 does not provide the option for changing the default finger positioning, because method 300 calculates the typeability score of identifier for an average typer using the most common finger positioning. Method 300 uses the finger positioning along with the keyboard layout to derive the moves made by the typer's fingers for entering characters of the string.

In block 308, method 300 calculates one or more typeability metrics. Typeability metrics are quantitative measures related to the finger moves for typing the identifier. In various embodiments, the typeability metrics may include the number of key presses used for typing the identifier, the location of pressed keys, the number of alterations between the two hands, the number or type of fingers used, the number of finger movements, the distances that the fingers must move, etc. In various embodiments, method 300 assigns a numerical value to each of the typeability metrics. For example, in certain embodiments for the QWERTY keyboard 110, the typeability metrics include the number of key presses for each of the rows in the keyboard. In some embodiments, each typeability metric can be a number. In some embodiments, each typeability metrics can be a positive real or integer number.

In block 310, method 300 calculates an overall typeability score as a function of the one or more typeability metrics. In certain embodiments, the typeability score is a weighted sum of the typeability metrics. In some embodiments, method 300 assigns to each typeability metric a weight which reflects the importance of the metrics in typeability. For example, in certain embodiment that measure a typeability score on a QWERTY keyboard 110 and for a standard ten-finger positioning, the weight assigned to a key press for a character in home row 114 is 0.5, for a character in top row 112 the assigned weight is 1.0, for a character in bottom row 116 the assigned weight is 1.5, and for a characters in number row 111 the assigned weight is 2.0. These relative values of the weights reflect that in these embodiments the assigned relative difficulty for pressing a key respectively increases from the home row, to the top, bottom, and number rows, with the home row being the least difficult and the number row being the most difficult. Alternatively, these relative values of the weights reflect that in these embodiments the relative probability of mistyping a character increases from the home row, to the top, bottom, and number rows, with the home row being the least prone to mistyping and the number row being the most prone to mistyping.

In certain embodiments, the typeability score thus calculated is a raw typeability score, reflecting an overall relative difficulty of typing the identifier or an overall relative probability of mistyping the identifier. A higher raw typeability score thus indicates that the identifier is more difficult to type or more prone to be mistyped. In some embodiments, the raw typeability score is an increasing function of the length of the string. For example, in some embodiments, the string "aaa" has a larger typeability score than the string "aa," because, even through the characters of the two strings are the same, the larger string requires more typing. In some other embodiments, the algorithm also calculates a normalized typeability score by normalizing the raw typeability score based on the length of the string.

In some embodiments, the algorithm also calculates the normalized typeability score of a string by dividing the raw typeability score of the string by the number of characters in the string. Thus, in these embodiments the strings "aaa" and "aa" have the same normalized typeability scores. In some embodiments, a normalized typeability score is calculated via dividing the raw typeability score by a maximal typeability score for strings with a number of characters equal to that of the identifier. A higher normalized typeability score indicates a larger average difficulty of typing or a larger average probability of mistyping for each character of the string. In certain embodiments, a typeability score system is provided for calculating and presenting to the user the raw typeability score or the normalized typeability score.

Figure 4:
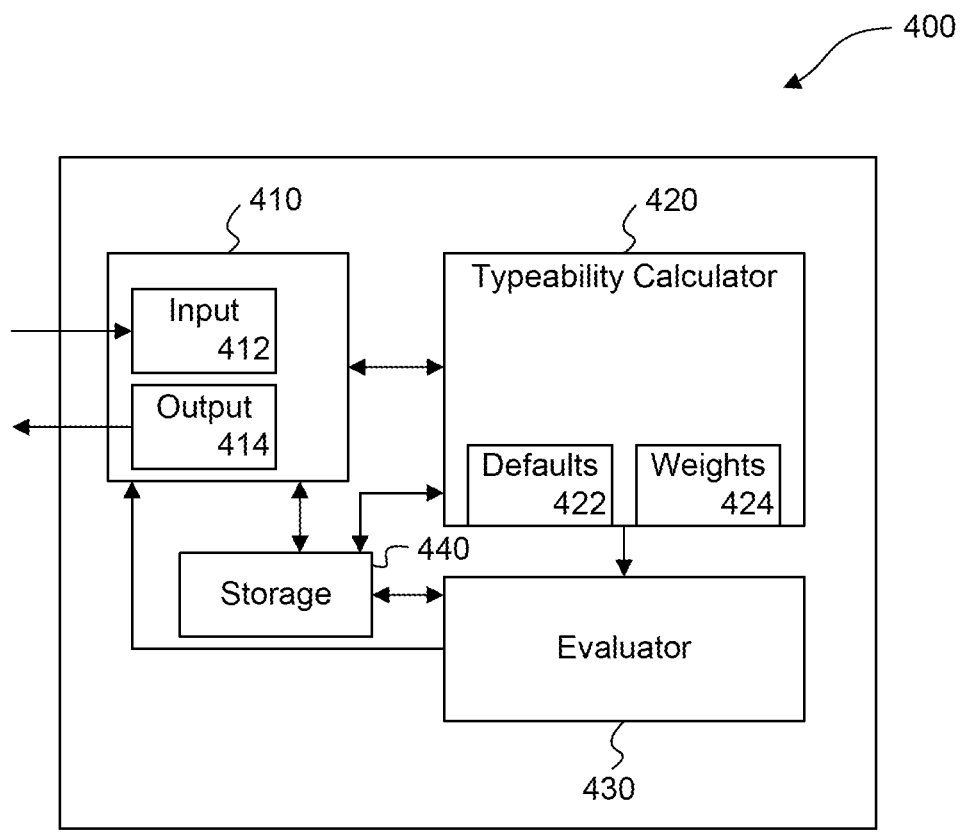
FIG. 4 illustrates a block diagram of a typeability scoring system in accordance with some embodiments.

FIG. 4 illustrates a block diagram of a typeability scoring system 400 in accordance with some embodiments. Typeability scoring system 400 includes an interface module 410, a typeability calculator module 420, a evaluator module 430, and a storage module 440. Further, interface module 410 includes an input module 412 and an output module 414. Moreover, typeability calculator module 420 includes a defaults module 422 and a weights module 424.

Interface module 410 receives input from one or more users and provides output to the users. In particular, in various embodiments, input module 412 provides an input mechanism for a user to enter a character string corresponding to an identifier. In some embodiments, input module 412 includes a mechanism for entering text, such as a text input window. In certain embodiments, input module 412 also includes mechanisms for entering the keyboard type or the finger positioning. In various embodiments, the keyboard input mechanism or the finger positioning mechanism includes a pull down menu, a selectable menu, or a text input window. In some embodiments, system 400 also provides a mechanism for the user to enter some ancillary information, such as the type of the identifier, the type of the typers who commonly use the identifier, or the environment in which the identifier is commonly used. In various embodiments, the types of the identifiers include a domain name, a user name, an email address, an address book alias, or a web address. In certain embodiments, the type of the typer is related to the age group, the profession, or the versatility of the typer in using a text input system, such as a keyboard. In various embodiments, system 400 uses the ancillary information to calculate the typeability score.

In some embodiments, for system 400 the identifier is a required input parameter. System 400 does not calculate the typeability score unless the user enters the identifier. In some embodiments, on the other hand, for system 400 one or both of the keyboard type and the finger positioning is an optional input. A user may choose not to enter one or both of these parameters and instead use the default value of that parameter. In certain embodiments, system 400 provides the user the option to enter the keyboard type only and accordingly determines the default finger positioning. In certain embodiments, system 400 assigns to both the keyboard type and the finger positioning some preset values.

Output module 414, on the other hand, provides a mechanism for presenting the calculated typeability score to the user. In various embodiments, the output mechanism includes a display window that displays the raw typeability score or the normalized typeability score; or some or all of the typeability metrics. In some embodiments, the output mechanism also displays a depiction of the keyboard type or the finger positioning used in the calculation.

Typeability calculator module 420 receives from interface module 410 one or more of the input information and accordingly calculates the typeability score. In particular, calculator module 420 receives the entered character string for the identifier. In various embodiments, calculator module 420 also receives from interface module 410 additional information such as the keyboard type or the finger positioning. Alternatively, in some embodiments, if the user does not enter additional information, or if system 400 does not provide the option for entering additional information, defaults module 422 instead provides some default values for these additional parameters. For example, in certain embodiments, where input module 412 does not provide the option to enter the keyboard type or if the user chooses not to enter the keyboard type and to instead use the default value, defaults module 422 sets the keyboard type to be the QWERTY keyboard 110. Alternatively, in certain embodiments, where input module 412 does not provide the option to enter the finger positioning or if the user chooses not to enter the finger positioning and to instead use the default value, defaults module 422 sets the finger positioning to be standard finger positioning for the a previously determined keyboard type.

Calculator module 420 further calculates the typeability metrics values based on the character string received from interface 410 and the values of the keyboard type and the finger positioning, each of which is either received from interface module 410 or determined by defaults module 422. Further, calculator module 420 calculates the typeability score for the entered identifier based on the calculated typeability metrics. To that end, in various embodiments, weights module 424 provides the weights corresponding to each of the typeability metrics. In some embodiments, the weights are set by system 400 based on one or more parameters, which include the keyboard type, the finger positioning, or the ancillary information. In some embodiments, one or more of the weights can be entered or changed by the user.

In some embodiments, evaluator module 430 utilizes the typeability score calculated by calculator module 420 to evaluate the strength of an identifier or to compare two or more identifiers. In some embodiments, evaluator module 430 evaluates the strength of an identifier based on one or more of the typeability scores and the typeability metrics. In some embodiments, evaluator module 430 evaluates the strength of an identifier by comparing the raw typeability score of the identifier with some threshold scores. Also, in various embodiments, evaluator module 430 compares two or more identifiers provided by a user, and sorts them based on their raw typeability scores or normalized typeability scores. In some embodiments, typeability scoring system 400 also proposes to a user one or more candidate identifiers. In some embodiments, system 400 sorts and proposes two or more candidate identifiers in accordance with some priority criteria. In certain embodiments, measuring the priority of a candidate identifier includes calculating the typeability score of that identifier.

In various embodiments, storage module 440 stores the information provided by one or more of interface module 410, calculator module 420, and evaluator module 430 and supplies this information to one or more of those modules when needed. This information may include the input information provided by a user, the typeability metrics, the typeability scores, the default values, and the weights provided or used by calculator module 420 comparison or sorting information provided by evaluator module 430, etc. In certain embodiments, storage module 440 also stores a standard finger positioning for each of the keyboard types, to be used by defaults module 422.

In various embodiments, typeability system 400 is a hardware module, such as a processor or a dedicated hardware, or a software module executed by a hardware. In various embodiments, system 400 executes software code, firmware software, or a combination thereof, for implementing parts or all of a typeability score algorithm, such as various blocks of method 300 of FIG. 3. In various embodiments, one or more of interface module 410, calculator module 420, evaluator module 430, and storage module 440, or the modules included in these modules, are hardware modules, software modules, or a combination thereof. In various embodiments, one or more of the modules in system 400 are implemented via a computing cloud. Further, in various embodiments, storage module 440 includes a non-transitory computer readable medium, such as a CD-ROM, a computer storage, or a flash memory, for storing information or software programs executed by various modules in system 400.

Figure 5:
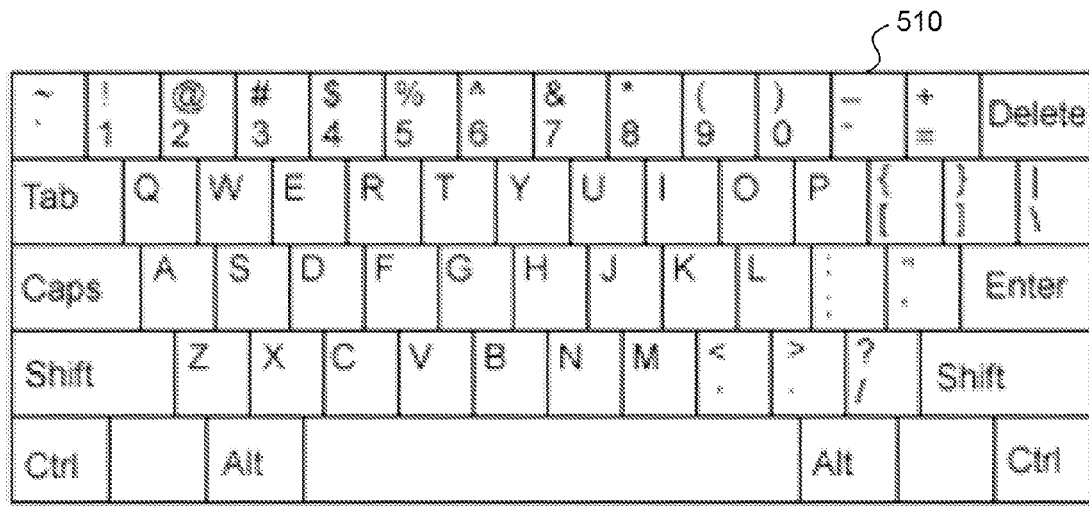
FIG. 5 shows a display presented by an interface in accordance with some embodiments.
Figure 5:
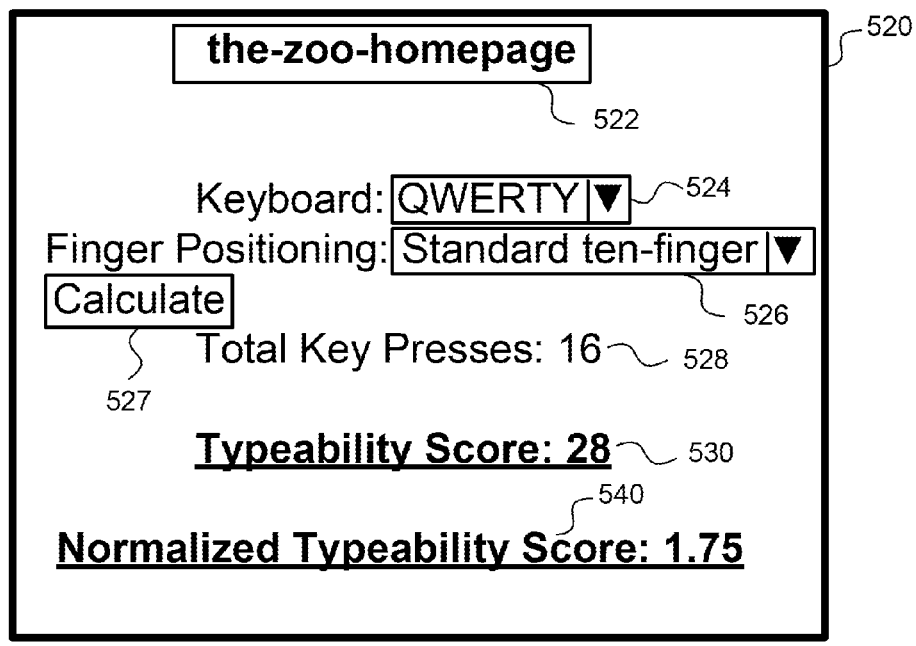

FIG. 5 shows a display 500 presented by interface 410 in accordance with some embodiments. Display 500 includes a keyboard image 510 and a dashboard 520. Keyboard image 510 displays a view of a QWERTY keyboard. Dashboard 520 includes an identifier window 522, a keyboard window 524, a finger positioning window 526, a calculate button 527, a total key display 528, a score display 530, and a normalized score display 540.

Keyboard image 510 displays the type of keyboard that system 400 uses for calculating the score. Identifier window 522 provides a mechanism for a user to enter the character string for the identifier. In some embodiments, identifier window 522 is a text input window. In the example shown in FIG. 5, a user has entered in identifier window 522 the character string "the-zoo-homepage" as the identifier.

Keyboard window 524 displays the determined keyboard type. In FIG. 5, keyboard window 524 is a pull down menu. In some other embodiments, keyboard window 524 is a selectable menu or a text input window. In some embodiments, system 400 presents a default value for the keyboard in keyboard window 524 and also allows a user to change the default value. In FIG. 5, the user has selected the QWERTY keyboard. In some embodiments, system 400 adjusts keyboard image 510 in accordance with the keyboard selection in keyboard window 524.

Finger positioning window 526 displays the determined finger positioning of the typer. In some embodiments, system 400 presents a default finger positioning based on the keyboard type already determined. For example, when a user chooses via keyboard window 524, the keyboard type QWERTY, system 400 may by default select the "Standard ten-finger" in finger positioning window 526. In some embodiments, system 400 allows a user to changed the default finger positioning, for example, based on the habits of the typer. In FIG. 5, finger positioning window 526 is a pull down menu, through which a user can select a finger positioning. In FIG. 5, finger positioning window 526 displays the finger positioning "Standard ten-finger" as the selected finger positioning. In various other embodiments, finger positioning window 526 is a selectable menu or a text input window. In some embodiments, system 400 displays in finger positioning window 526 the finger positioning commonly used by typers for the already determined keyboard type, and further does not allow the user to change that default finger positioning. In certain embodiments, system 400 thus calculates the typeability score based on the most common typing habits of users on the determined keyboard type. In some embodiments, dashboard 520 also provides a mechanism to a user for entering one or more ancillary information, such as the type of the identifier, the type of typers who repeatedly use the identifier, or the environment in which the identifier is used.

Once a user enters the desired identifier in identifier window 522 and one or more of the keyboard type, the finger positioning, and the ancillary information, the user may click calculate button 527 for system 400 to calculate one or more typeability metrics and the resulting typeability score based on the input information. In response, dashboard 520 displays one or more of the calculated typeability metrics, typeability score, and normalized typeability score.

In FIG. 5, dashboard 520 displays a typeability metric, total key presses, in total key display 528. Total key presses display 528 displays the total number of key presses required to enter the identifier based on one or more of the keyboard type, the finger positioning, and the ancillary information. In the example shown in FIG. 5, total key display 528 displays a number 16, indicating when a typer types the character string "the-zoo-homepage" on a QWERTY keyboard with a standard ten-finger positioning, the typer presses a total of 16 keys. In some embodiments, system 400 also displays one or more other typeability metrics in dashboard 520.

In display 500, score display 530 displays the raw typeability score calculated by system 400 based on the calculated metrics. Further, normalized score display 540 displays the normalized typeability score calculated based on the raw typeability score and other metrics. In the example shown in FIG. 5, score display 530 shows a raw typeability score of 28, and normalized score display 540 displays a normalized typeability score of 1.75. The calculation that lead to these values in this embodiment are detailed below.

In the embodiment shown in FIG. 5, calculator module 420 calculates a plurality of metrics for the string "the-zoo-homepage" and accordingly calculates the typeability score of 28 shown in score window 530. In particular, calculator module 420 calculates the typeability metrics Number Row, Top Row, Home Row, Bottom Row, Alternation Between Hands (ABH), Distance, Repeated Characters (RC), and Total Keys. Further, calculator module 420 assigns to each metrics a weight and calculates the typeability score as the weighted sum of the calculated metrics.

Number Row, Top Row, Home Row, and Bottom Row metrics each indicate the number of characters pressed in the corresponding row. In the example of FIG. 5, the character string is "the-zoo-homepage" and the keyboard is QWERTY. For these parameters, the key presses are two in the number row (the two dashes), eight in the top row (T, E, O, O, O, E, P, E), four in the home row (H, H, A, G), and two in the bottom row (Z, M). Therefore, the values of the Number Row, Top Row, Home Row, and Bottom Row metrics are respectively, 2, 8, 4, and 2. Further, the value of the Total Keys is the sum of these key presses, that is 16, as also displayed in total key display 528.

The Alteration Between Hands (ABH) metrics indicates the number of times during typing of the string that a typer alters from one hand to another. For example, in the example of FIG. 5, a typer that types the string "the-zoo-homepage" on a QWERTY keyboard using a standard ten-finger positioning, ABH is 8. This ABH value corresponds to four hand alteration from left to right hands (when typing the sequences "th", "e-", "zo", and "ep") and another four hand alterations from right to left hands (when typing the sequences "he", "-z", "me", "pa").

The Distance metrics measures the total distance that the fingers of the typer move when typing the string. In various embodiments, the Distance is the sum of distances moved by various finger. In the example of FIG. 5, calculator module 420 assigns to each character a distance that is equal to the distance on the keyboard between the key assigned to the character and the home position of the typing finger, that is, the finger that types that character. Further, when a character is identical to the previous character, calculator module 420 assigns a zero distance to that character, because the typing finger does not have to move when typing a repeating character.

For instance, in the example shown in FIG. 5, for typing the string "the-zoo-homepage" on a QWERTY keyboard with a standard ten-finger positioning, calculator module 420 assigns a zero Distance value to the characters "a", which is assigned to the A key, for which the typing finger is the left little finger also positioned over the A key. Similarly, calculator module 420 assigns a zero Distance to the second letter "o" in "zoo" because this character is identical to the previous character and thus does not require any additional movement by its typing finger, that is, the right ring finger. Further, calculator module 420 assigns to the character "t" the distance D(F,T), which is the distance between the F and T keys on a standard QWERTY keyboard; because the T key is the target key corresponding to the character "t", for which the typing finger is the left index finger, and the F key is the home position of that typing finger. Similarly, calculator module 420 assigns to the first "o" character in "zoo" the distance D(L,O), which is the distance between the L and O keys on a standard QWERTY keyboard, because the O key is the target key for typing the character "o", the typing finger that presses the O key is the right ring finger, and the L key is the home position of this typing finger. In the example of FIG. 5 and based on the distance values for each character, calculator module 420 determines that the total distance for the string "the-zoo-homepage" is 0.5 meters.

The Repeated Character metrics counts the number of characters that are identical to the character before them. For the embodiment shown in FIG. 5, for example, the Repeated Character metrics equals 1, corresponding to the second "o" character in "zoo".

Calculator module 420 uses the calculated metrics and the corresponding weights to calculate the typeability score displayed in score display 530. In the embodiment shown in FIG. 5, weights module 424 respectively assigns to the typeability metrics Number Row, Top Row, Home Row, and Bottom Row the weight values 2.0, 1.0, 0.5, and 1.5. Moreover, weights module 424 respectively assigns to the typeability metrics Alternation Between Hands and Repeated Characters the weight values 0.5 and −1.0. The negative weight for Repeated Characters metrics indicates that in this embodiment an increase in this metric indicates a reduction in the difficulty of typing the string. Finally, in this embodiment, the weight for the Total Keys metrics is the total Distance metrics. In other embodiments, other weight values are used.

In FIG. 5, based on the above metrics values and weights, calculator 420 calculates the typeability score for "the-zoo-homepage" as a weighted sum. In particular, in this embodiment, the typeability score is calculated using Equation (1):

$$\sum_{i=1}^{N} k(i)U(i) \quad (1)$$

In Equation 1, index i runs over typeability metrics, N is the total number of those metrics, U(i) is the value and k(i) is the weight for the i'th metric.

For the embodiment shown in FIG. 5 and based on the metrics and weights discussed above, calculator 420 thus calculates the raw typeability score for the string "the-zoo-homepage" to be 28:

$$2*2+1*8+0.5*4+1.5*2+0.5*8+0.5*16+(-1)*1=28 \quad (2)$$

In Equation (2), the terms of the weighted sum respectively correspond to the typeability metrics Number Row, Top Row, Home Row, Bottom Row, Alternation Between Hands, Total Keys, and Repeated Characters (RC). Various embodiments may use different metrics or different weights for calculating the typeability score.

In FIG. 5, calculator module 420 also calculates the normalized typeability score, as displayed in normalized score display 540. In this embodiment, calculator module 420 calculates the normalized typeability score as the ratio of the raw typeability score 28 and the number of characters 16, to derive 1.75.

Figure 6A:
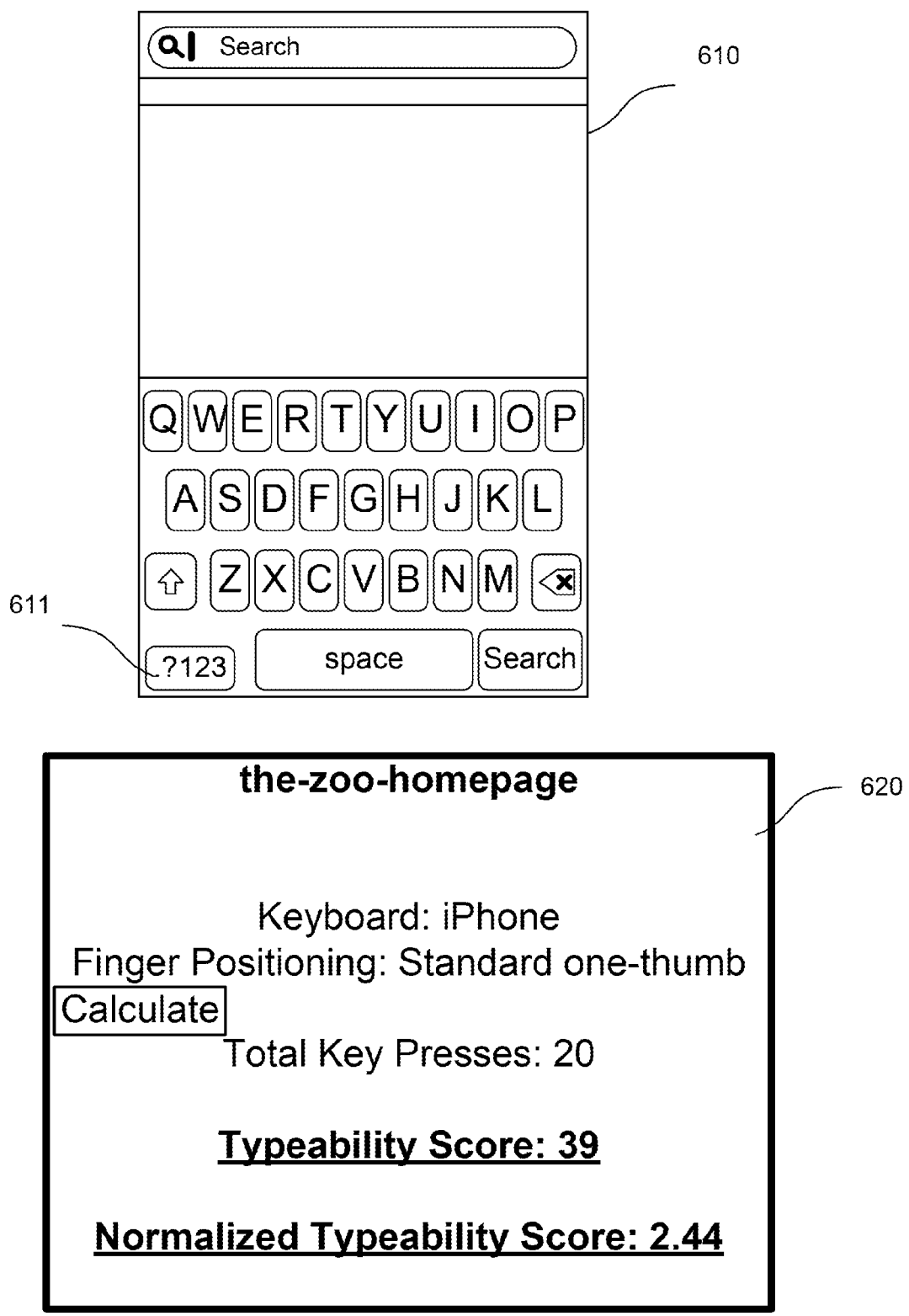
FIGS. 6A and 6B show two displays presented by an interface in accordance with some embodiments.
Figure 6B:
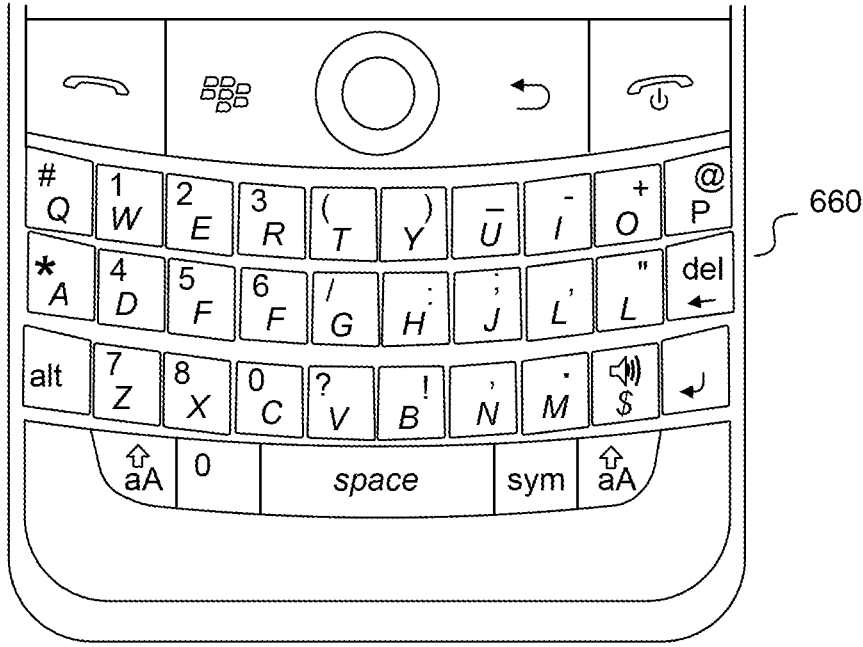
Figure 6B:
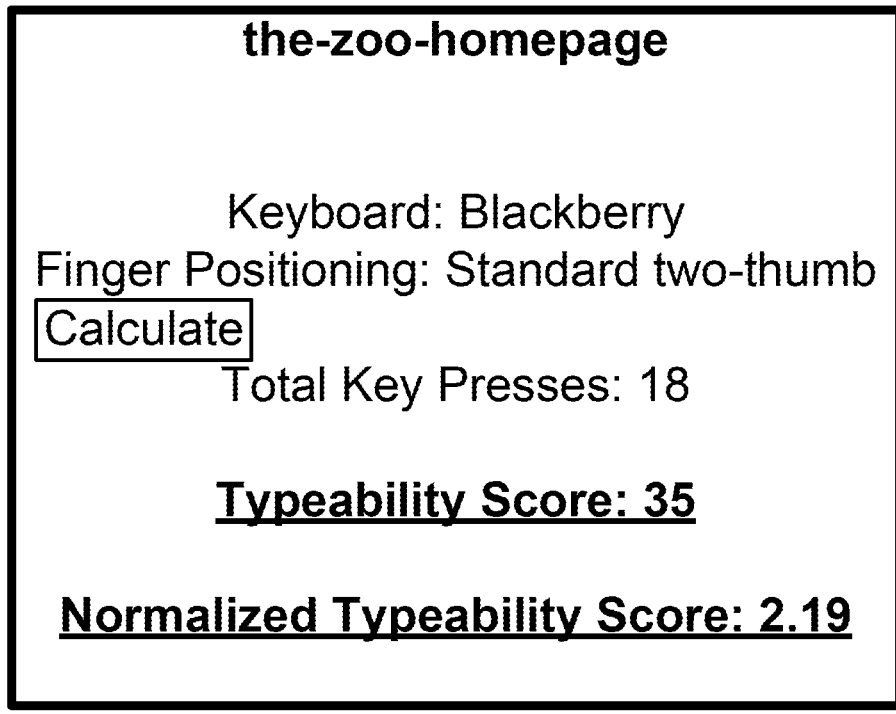

Various embodiments use similar methods for calculating the typeability score for other types of keyboard type or finger positioning. FIGS. 6A and 6B, for example, respectively show displays 600 and 650 presented by interface 410 in accordance with some embodiments.

Display 600 corresponds to calculating the typeability score of the string "the-zoo-homepage" for an iPhone® type keyboard, while display 650 corresponds to calculating the typeability scores of the same string for a Blackberry® type keyboard. Display 600 includes a keyboard image 610 displaying an iPhone® type keyboard, and a dashboard 620 displaying some parameters for the typeability score. In particular, dashboard 620 indicates that in this embodiment the string is "the-zoo-homepage", the keyboard type is "iPhone®", the finger positioning is the standard one-thumb positioning, and the total key presses is 20. The total key presses for the iPhone® in FIG. 6A exceeds the same metrics for the QWERTY keyboard of FIG. 5, because in the iPhone® keyboard, typing each of the dashes requires two additional key presses, one key press of "123" key 611 for switching to the display that shows the dash key and another key press of the "ABC" key for switching back to the character key display.

Further, as shown in FIG. 6A, calculator 420 calculates the typeability metrics and accordingly a raw typeability score of 39 for this example. Further, calculator 420 calculates the normalized typeability score of 2.44 by dividing the raw typeability score (39) by the total number of characters (16).

In FIG. 6B, on the other hand, display 650 includes a keyboard image 660 displaying a Blackberry® type keyboard, and a dashboard 670 displaying some parameters for the typeability score. In particular, dashboard 670 indicates that in this embodiment the string is "the-zoo-homepage", the keyboard type is "Blackberry®", the finger positioning is the standard two-thumb positioning, and the total key presses is 18. Further, in the example of FIG. 6B, calculator 420 calculates the typeability metrics and accordingly a raw typeability score of 35. Further, calculator 420 calculates the normalized typeability score of 2.19 by dividing the raw typeability score (35) by the total number of characters (16).

In various embodiments, the number and type of metrics, the method of calculating each metric, and the weight assigned to each metric varies. For example, in some embodiments, the distance value for each character pressed by a finger is calculated as the distance between that character's key and the key for the previous character pressed by same finger. Further, in these embodiments, for the first character pressed by a typing finger, the distance is calculated as the distance between the corresponding key and the home position of that typing finger. In some other embodiments, the metrics also include the number of times that each of various fingers are used. In certain embodiments, a larger weight is assigned to each use of the little finger compared to each use of the index finger, because typing a character with the little finger is more difficult or more prone to mistyping compared to typing a character with the index finger. Moreover, in some embodiments, different weights are assigned to key presses with the right and left hands, because the difficulty or probability of error differs between the two hands.

In some embodiments, system 400 also provides feedback on possible strings for an identifier. A user proposes an identifier to system 400, and in return system 400 provides feedback regarding usability of the identifier. In certain embodiments, the feedback rates using strength levels, such as very strong, strong, weak, and very weak. In some embodiments, the strength level of an identifier depends, at least in part, on the typeability score of the identifier.

In some embodiments, evaluator module 430 uses threshold values to map the raw typeability score of an identifier to a strength level. For example, in one embodiment, evaluator module 430 may determine that raw typeability scores below or equal to a first threshold value 5 correspond to very strong identifiers, scores above 5 and below or equal to a second threshold value 15 correspond to strong identifiers, scores above 15 and below or equal to a third threshold value 30 correspond to weak identifiers, and scores above 30 correspond to very weak identifiers. Therefore, in such an embodiment evaluator module 430 will determine that the identifier "the-zoo-homepage" when typed on a QWERTY keyboard with standard ten-finger positioning is a weak identifier because its raw typeability score is 28, as shown in FIG. 5. In the same embodiments, evaluator module 430 will determine that the same identifier "the-zoo-homepage" when typed on an iPhone® type or a Blackberry® type keyboard each with their standard finger positioning is a very weak identifier because the typeability scores in those situations are respectively 39 and 35, as shown in FIGS. 6A and 6B. In certain embodiments, to determine the strength level of an identifier, evaluator module 430 uses the normalized typeability score of the identifier, and compares that normalized score with some threshold values for normalized scores.

Figure 7:
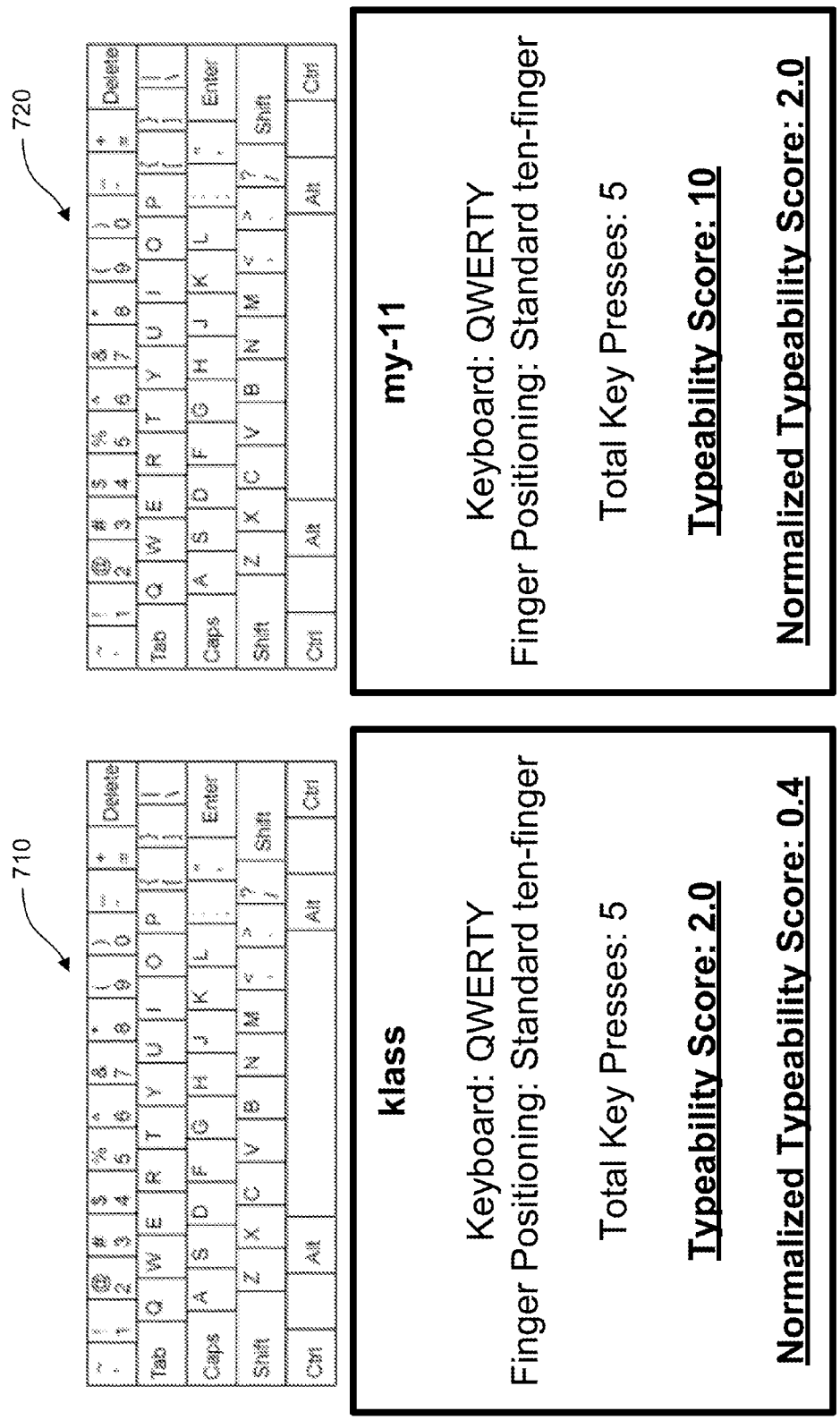
FIG. 7 shows an evaluator display in accordance with such an embodiment.

In some embodiments, evaluator module 430 compares two or more identifiers provided by a user based on the typeability metrics and scores calculated by calculator 420. FIG. 7 shows an evaluator display 700 in accordance with such an embodiment. Display 700 compares the typeability scores of two identifiers "klass" and "my-11". In particular, display 700 includes two display sections 710 and 720, which respectively display the typeability scores for two exemplary identifiers "klass" and "my-11" when typed on a QWERTY keyboard with standard ten-finger positioning. Display section 710 indicates that for the identifier "klass" the corresponding total key presses, raw typeability score, and normalized typeability score are respectively 5, 2.0, and 0.4. Display section 720, on the other hand, indicates that for the identifier "my-11", the same parameters are respectively 5, 10, and 2.0.

In some embodiments, when comparing two or more identifiers, evaluator module 430 will propose one of those identifiers as the preferred identifier, based on one or more of the typeability scores or typeability metrics. For example, in the embodiment shown in FIG. 7, evaluator module 430 may propose that the user chose the identifier "klass" over the identifier "my-11", because "klass" has a lower typeability score.

In some embodiments, to evaluate an identifier, evaluator module 430 calculates an average typeability score for the identifier, by averaging the typeability scores of the identifier on a plurality of commonly used keyboard types and finger positionings. For example, in some embodiments, evaluator module 430 calculates an average typeability score for an identifier by adding the typeability scores of the identifier on a QWERTY keyboard with a ten-finger positioning, an iPhone® style keyboard with a one-finger positioning, and a Blackberry® style keyboard with a two-finger positioning, and dividing the sum by three.

In certain embodiments, to calculate the average typeability score for an identifier, evaluator module 430 considers the typeability scores of the identifier for a plurality of keyboard types and for one or more finger positioning for each of that plurality of keyboard types. In certain embodiments, the plurality of keyboard types and finger positionings correspond to a variety of keyboard types and finger positionings utilized by various typers belonging to different geographical areas, languages, cultures, or age groups. In some embodiments, for each of the plurality of keyboard types, evaluator module 430 considers permutations of possible, probable, or common finger positionings corresponding to that keyboard type. In some embodiments, instead of a simple average, evaluator module 430 calculates a weighted average of the plurality of typeability scores. In certain embodiments, the weight assigned to each typeability score corresponds to the extent of the use of the corresponding keyboard type and finger positioning among a population of typers. In some embodiments, evaluator module 430 compares various identifiers based on the average typeability scores of the identifiers.

Alternatively, in some embodiments, system 400 may consider multiple candidates for the identifier. For example, system 400 may calculate the typeability scores for multiple identifiers, sort the results, and propose them in order of typeability, for instance, from the lowest typeability score to the highest typeability score. Alternatively, when proposing an identifier, such as a domain name, system 400 may consider the typeability score of some candidate domain names as one of the factors for recommending them to the user.

In various embodiments, system 400 considers one or more factors other than the raw typeability score to determine the strength of an identifier, or to compare or sort two or more identifiers. In certain embodiments, these additional factors include the number of key presses or the normalized typeability score, which are calculated by calculator 420. Moreover, system 400 may base the strength of an identifier on the keyboard type or the finger positioning. For example, in certain embodiments, system 400 may determine that identifiers with raw typeability scores between 20 and 40 on a QWERTY keyboard are weak identifiers, but identifiers with the same range of scores on an iPhone® keyboard are strong identifiers. In such an embodiment, the identifier "the-zoo-homepage" thus rates as a weak identifier on a QWERTY keyboard on which the identifier scores 28, but rates as a strong identifier on an iPhone® keyboard, on which the identifier scores 39. In certain embodiments, the additional factors also include relevance of the identifier to the content of the target. System 400 may receive such additional factors from external means.

In some embodiments, system 400 helps detect machine-generated traffic. For example, a DNS resolution system sometimes receives a request for a domain name that does not exist. The non-existent domain name (NXD) may indicate an innocent error by a user who has mistyped a real domain name. Alternatively, the NXD may indicate a malicious DNS request by a hacking software that uses various machine-generated random domain names for identifying a point of entry. When a user mistypes a domain name, the resulting non-existent domain name is often more typeable than a randomly generated domain name. System 400 can thus distinguish between the two types of NXD requests from the typeability scores of the NXDs. In some embodiments, system 400 may calculate a probability that an NXD is machine generated based on one or more of the raw typeability score and the normalized typeability score; or one or more of the typeability metrics. System 400 can use this typeability score to identify a risk of an attack because a less typeable domain name indicates a higher probability that the domain name was generated by a machine.

For example, in certain embodiments, system 400 determines that the probability that an NXD is generated by a machine is equal to the value of the typeability score of the NXD, as typed on a QWERTY keyboard using standard ten-finger positioning, normalized based on non-decreasing function. In some embodiments, for scores below or equal to zero the probability value is zero; for scores between 0 and 100 the probability value is the ratio of the score to a maximum threshold score of 100; and the probability is equal to the maximum probably of 1 for scores above 100. In some other embodiments, the non-decreasing function is chosen such that the probability approaches but does not equal the maximum probability value of 1 as the score increases to values equal or greater than the maximum threshold score.

The foregoing description of the invention, along with its associated embodiments, has been presented for purposes of illustration only. It is not exhaustive and does not limit the invention to the precise form disclosed. Those skilled in the art will appreciate from the foregoing description that modifications and variations are possible in light of the above teachings or may be acquired from practicing the invention. For example, the steps described need not be performed in the same sequence discussed or with the same degree of separation. Likewise various steps may be omitted, repeated, or combined, as necessary, to achieve the same or similar objectives. Similarly, the systems described need not necessarily include all parts described in the embodiments, and may also include other parts not describe in the embodiments.

In various embodiments, one of more of the disclosed modules are implemented via one or more processors executing software programs for performing the functionality of the corresponding modules. In some embodiments, one or more of the disclosed modules are implemented via one or more hardware modules executing firmware for performing the functionality of the corresponding modules. In various embodiments, one or more of the disclosed modules or disclosed storage mediums are internal or external to the disclose systems. In some embodiments, one or more of the disclosed modules or storage media are implemented via a computing "cloud", to which the disclosed system connects via an internet and accordingly uses the external module or storage medium. In some embodiments, the disclosed storage media for storing information include non-transitory computer readable media, such as a CD-ROM, a computer storage, or a flash memory.

Accordingly, the invention is not limited to the above-described embodiments, but instead is defined by the appended claims in light of their full scope of equivalents.

The invention claimed is:

1. A method for assessing an identifier, the method comprising:
   receiving a string of characters making up the identifier;
   determining a keyboard type for a keyboard;
   calculating, by a calculator module, a typeability score for the identifier based on the string of characters and the keyboard type, wherein the typeability score signifies a difficulty of typing the identifier on the keyboard type, and wherein the typeability score is a raw typeability score; and
   calculating a normalized typeability score via dividing the raw typeability score by a maximal typeability score or by a number of characters in the string of characters.

2. The method of claim 1, wherein calculating the typeability score for the identifier comprises:
   calculating, by the calculator module, a plurality of metrics for typing the string of characters based on the keyboard type; and
   calculating the typeabilty score as a weighted sum of the plurality of metrics.

3. The method of claim 1, further comprising determining a finger positioning corresponding to a position of a typer's fingers on the keyboard, wherein the typeability score is further based on the finger positioning.

4. The method of claim 3, wherein determining the finger positioning comprises receiving the finger positioning or setting the finger positioning to a default finger positioning that corresponds to the keyboard type.

5. The method of claim 1, further comprising:
   calculating typeability scores for a plurality of identifiers; and
   sorting the plurality of identifiers based on the typeability scores and presenting the sorted plurality of identifiers to a user.

6. The method of claim 1, further comprising assessing, based on the typeability score, whether the identifier is generated by an automated process, wherein the assessing comprises calculating a probability that the identifier is generated by an automated process and wherein the probability is a non-decreasing function of the typeability score.

7. The method of claim 1, wherein determining the keyboard type for the keyboard includes receiving the keyboard type or setting the keyboard type to a default keyboard type.

8. A system for assessing an identifier, the system comprising:
   an interface for receiving a string of characters for the identifier; and
   a calculator module for:
      calculating a typeability score for the identifier based on the string of characters and a keyboard type for a keyboard, wherein the typeability score signifies a difficulty of typing the identifier on the type of keyboard, and wherein the typeability score is a raw typeability score; and
      calculating a normalized typeability score via dividing the raw typeability score by a maximal typeability score or by a number of characters in the string of characters.

9. The system of claim 8, wherein the calculator module calculates the typeability score for the identifier by calculating a plurality of metrics for typing the string of characters based on the keyboard type and by further calculating the typeabilty score as a weighted sum of the plurality of metrics.

10. The system of claim 8, wherein the calculator module is further for determining a finger positioning corresponding to a positioning of a typer's fingers on the keyboard, and wherein the typeability score is further based on the finger positioning.

11. The system of claim 8, wherein the identifier is a domain name.

12. A non-transitory computer readable medium encoded with a computer program, wherein the computer program, when executed by one or more computer processors, causes the one or more computer processors to execute a method for assessing an identifier, the method comprising:
   receiving a string of characters making up the identifier;
   determining a keyboard type for a keyboard;
   calculating a typeability score for the identifier based on the string of characters and the keyboard type, wherein the typeability score signifies a difficulty of typing the identifier on the keyboard type, and wherein the typeability score is a raw typeability score; and
   calculating a normalized typeability score via dividing the raw typeability score by a maximal typeability score or by a number of characters in the string of characters.

13. The non-transitory computer readable medium of claim 12, wherein calculating the typeability score for the identifier comprises:
   calculating a plurality of metrics for typing the string of characters based on the keyboard type; and
   calculating the typeabilty score as a weighted sum of the plurality of metrics,
   wherein the weighted sum assigns a weight to each of the plurality of metrics based on an importance of the corresponding metrics to the ease or difficulty of typing the identifier.

14. The non-transitory computer readable medium of claim 12, wherein the method further comprises determining a finger positioning corresponding to a position of a typer's fingers on the keyboard, and wherein the typeability score is further based on the finger positioning, wherein the finger positioning is based on the typer's typing habits.

15. The non-transitory computer readable medium of claim 14, wherein determining the finger positioning comprises receiving the finger positioning or setting the finger positioning to a default finger positioning that corresponds to the keyboard type.

16. The non-transitory computer readable medium of claim 12, wherein the identifier is a domain name.

17. The non-transitory computer readable medium of claim 12, wherein the method further comprises proposing the identifier to a user based on the calculated typeability score.

18. The non-transitory computer readable medium of claim 12, wherein the method further comprises assessing, based on the typeability score, whether the identifier is generated by an automated process.

19. The non-transitory computer readable medium of claim 12, wherein determining the keyboard type for the keyboard includes receiving the keyboard type or setting the keyboard type to a default keyboard type.

20. The non-transitory computer readable medium of claim 12, wherein the method further comprises calculating, for the identifier, a plurality of typeability scores corresponding to a plurality of keyboard types and calculating an average typeability score for the identifier by finding a simple average or a weighted average of the plurality of typeability scores.

21. The non-transitory computer readable medium of claim 20, wherein each of the plurality of typeability scores corresponds to one keyboard type of the plurality of keyboard types and to one finger positioning of one or more finger positionings that correspond to the one keyboard type.

* * * * *